United States Patent
Schmidl et al.

(10) Patent No.: US 7,184,458 B2
(45) Date of Patent: Feb. 27, 2007

(54) REDUCED SUBSET SCAN AND DUAL FREQUENCY WAKEUP FOR BLUETOOTH INQUIRY OPERATION

(75) Inventors: Timothy M. Schmidl, Dallas, TX (US); Anand G. Dabak, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 767 days.

(21) Appl. No.: 09/953,533

(22) Filed: Sep. 12, 2001

(65) Prior Publication Data

US 2002/0114377 A1  Aug. 22, 2002

Related U.S. Application Data

(60) Provisional application No. 60/270,077, filed on Feb. 20, 2001, provisional application No. 60/270,064, filed on Feb. 20, 2001.

(51) Int. Cl.
*H04B 1/713* (2006.01)

(52) U.S. Cl. .................................. 375/132

(58) Field of Classification Search ............ 375/132, 375/133, 281, 322, 345; 370/255, 331, 338, 370/449; 455/41.1, 62, 63, 436, 437, 444, 455/452, 522, 154, 450, 455, 434
See application file for complete search history.

(56) References Cited

U.S. PATENT DOCUMENTS 4,850,036 A * 7/1989 Smith .................. 455/502

(Continued)

FOREIGN PATENT DOCUMENTS

WO   WO 00 36757 A   6/2000

OTHER PUBLICATIONS

Peterson et al., A Specification-Compatible Bluetooth Inquiry Simplification, Jan. 5-8, 2004, System Sciences, 2004. Proceedings of the 37th Annual International Conference on, pp. 307-315.*

(Continued)

*Primary Examiner*—Emmanuel Bayard
*Assistant Examiner*—Lawrence B. Williams
(74) *Attorney, Agent, or Firm*—Ronald O. Neerings; Wade J. Brady, III; Frederick J. Telecky, Jr.

(57) ABSTRACT

An inquiry message is transmitted successively on each of a first plurality of transmit frequencies (44–48) and thereafter successively on each of a second plurality of transmit frequencies (51), in order to ensure that a first wireless communication apparatus that listens on one of the transmit frequencies will receive the inquiry message. The first plurality of transmit frequencies can also be ensured (25–28) to include a frequency on which a second wireless communication apparatus is listening for the inquiry message. With respect to reception of an inquiry message that is transmitted successively on each of first and thereafter second pluralities of transmit frequencies, after receipt (61) of the initial inquiry message and subsequent expiration of a corresponding backoff period (62), the inquiry message is first listened for on a first frequency of the first plurality of transmit frequencies for a predetermined time (63). If the inquiry message is not received on the first frequency during the first listening operation, the inquiry message is then listened for on a second frequency of the second plurality of transmit frequencies for a predetermined time (64).

49 Claims, 3 Drawing Sheets

U.S. PATENT DOCUMENTS

| | | | | |
|---|---|---|---|---|
| 4,872,205 | A | * | 10/1989 | Smith .......................... 455/527 |
| 5,239,677 | A | * | 8/1993 | Jasinski ....................... 455/509 |
| 5,274,666 | A | * | 12/1993 | Dowdell et al. ............. 375/133 |
| 5,521,601 | A | * | 5/1996 | Kandlur et al. ............... 342/44 |
| 5,940,431 | A | * | 8/1999 | Haartsen et al. ............ 375/131 |
| 6,414,626 | B1 | * | 7/2002 | Greef et al. ................. 342/127 |
| 6,509,828 | B2 | * | 1/2003 | Bolavage et al. .......... 340/10.1 |
| 6,675,025 | B1 | * | 1/2004 | Raaf ........................... 455/561 |
| 2001/0019965 | A1 | * | 9/2001 | Ochi ............................ 463/25 |
| 2002/0019214 | A1 | * | 2/2002 | Brown et al. ................. 455/63 |
| 2002/0071477 | A1 | * | 6/2002 | Orava ......................... 375/132 |
| 2004/0198358 | A1 | * | 10/2004 | Kim et al. .................. 455/436 |
| 2004/0203359 | A1 | * | 10/2004 | Sasai et al. ................ 455/41.1 |

OTHER PUBLICATIONS

"Specification of the Bluetooth System, Specification vol. 1, Wireless Connections made easy, Core, V1.0 B, Chapter 10 Channel Control and Chapter 11 Hope Selection", Specification of the Bluetooth System, vol. 1, Dec. 1, 1999.

* cited by examiner

REDUCED SUBSET SCAN AND DUAL FREQUENCY WAKEUP FOR BLUETOOTH INQUIRY OPERATION

This application claims the priority under 35 USC 119(e)(1) of copending U.S. Provisional Application Nos. 60/270,077 and 60/270,064, both filed on Feb. 20, 2001.

FIELD OF THE INVENTION

The invention relates generally to wireless communications and, more particularly, to frequency hopping wireless communications.

BACKGROUND OF THE INVENTION

In the Bluetooth system, when a device wants to determine what other Bluetooth devices are within range, it can perform an inquiry. The conventional inquiry operation is described in "Specification of the Bluetooth System," v1.0A, Jul. 26, 1999 (incorporated herein by reference). A device that performs the inquiry is called the master, and a device which periodically scans for inquiries with inquiry scans is called the slave. The slave wakes up every 2.56 s (or a shorter interval) to perform an inquiry scan for 18 time slots (there are 1600 time slots per second). The slave monitors a single frequency out of 32 possible frequencies. During the inquiry, the master transmits on two frequencies on one time slot and then listens on two frequencies during the next time slot. Thus, on an average, the master can transmit on 16 different frequencies during 16 time slots. The master continues to repeat the inquiry messages using the 16 frequencies for 2.56 s. There are a total of 32 possible frequencies used during inquiry, and the master splits the frequencies into two 16-hop parts, called trains. After transmitting on train A for 2.56 s, the master switches to train B. Currently, at least 3 train switches occur during inquiry, so the inquiry substate lasts at least 10.24 s.

A slave performing an inquiry scan determines a frequency to monitor based on the general inquiry access code (GIAC) and some of the bits from its native clock. The X input value into the frequency selector of the slave is given by:

$$X_S = CLKN_{16-12}$$

Bit 12 of the clock changes every 1.28 s. The 5 bits from the clock (bits 16, 15, 14, 13, 12) map to the 32 frequencies that are to be monitored. If the slave wakes up every 2.56 s, then it will only end up monitoring 16 frequencies since bit 13 changes every 2.56 s.

The 16 frequencies for train A or train B are determined by the GIAC and the native clock of the master. The X input value into the frequency selector of the master is given by:

$$X_M = \lfloor CLKN_{16-12} + \kappa_{offset} + (CLKN_{4-2,0} - CLKN_{16-12}) \bmod 16 \rfloor \bmod 32 \quad (1)$$

where $\kappa_{offset} = 24$ gives the train A and $\kappa_{offset} = 8$ gives the train B.

One disadvantage of the conventional Bluetooth inquiry operation is that there are 32 frequencies used in the inquiry, but the master can only transmit on 16 frequencies during the 18 time slot window in which the slave scans. Because of the uncertainty of which of the 32 frequencies each slave will monitor upon wakeup, the master must spend 2.56 s on one train and 2.56 s on the second train (total of 5.12 s) before it can be sure that the slave hears its inquiry message (assuming an error-free environment). In environments where there are channel errors, the inquiry substate may need to last even longer.

It is therefore desirable to reduce the amount of time required for assurance that a slave has heard the master's inquiry.

The invention provides a technique for ensuring that the slave will be listening at a frequency contained in the frequency train that the master uses first during inquiry transmission. This can advantageously reduce the time needed for inquiry.

In conventional Bluetooth inquiry operation, when the slave hears the master's inquiry message, it does not respond immediately. To avoid collisions in the case that several slaves wake up at the same time, a random backoff procedure is employed. The slave stores the current value of the frequency at which it heard the master's inquiry message, and generates a random number between 0 and 1023. The slave then waits this random number of time slots, which corresponds to 0 to 1023/1600 s. Upon waking up, the slave listens again at the stored frequency for the master's inquiry message. If the slave receives another inquiry message from the master, then the slave immediately returns an FHS packet, which is a special control packet containing the Bluetooth device address and the clock of the sender (the slave in this case). The slave then adds an offset of 1 to (i.e., increments) the phase of the inquiry hop sequence and performs an inquiry scan on this next frequency. If the slave is triggered (i.e., hears the inquiry message) again, then it repeats the above procedure with a new random number.

During a 1.28 s probing window, a slave on average will return 4 FHS packets on different frequencies and at different times. However, if during the inquiry scan, the slave does not receive another inquiry message from the master within a time-out period, the slave returns to the standby or connection state.

Due to the backoff period, another disadvantage of the conventional Bluetooth inquiry operation is that the master may have switched trains during the backoff period. The probability of this happening is 512 time slots (the average backoff time)/4096 time slots (the time between train switches)=0.125. This is the probability for each slave, so with many slaves there is a large probability that a train switch will occur before at least one of them can respond. This is the reason that the master needs to perform the inquiry for at least 10.24 s. FIG. 5 illustrates this situation. A slave may be listening on train B while the master starts transmitting on train A for 2.56 s. Therefore, the slave does not hear the master at 52 during train A. When the master switches to train B, the slave will wake up and hear the master at 53, but if it wakes up too near the end of train B, then it may not be able to respond (which includes time to back off and then re-trigger) before the master switches back to train A, resulting in a time out at 54. The slave is finally able to respond (i.e., back off, then re-trigger, then respond) when it is triggered at 55 after the master has returned to train B. This procedure is inefficient and disadvantageously extends the inquiry time.

It is therefore desirable to avoid the inquiry time extension that can occur due to the combination of slave backoff time and train switches by the master.

The invention permits a slave to listen on frequencies which alternate from one to the other of the master's trains in correspondence with each new slave inquiry scan window. This advantageously permits avoidance of the aforementioned inquiry time extension.

DETAILED DESCRIPTION

Figure 1:
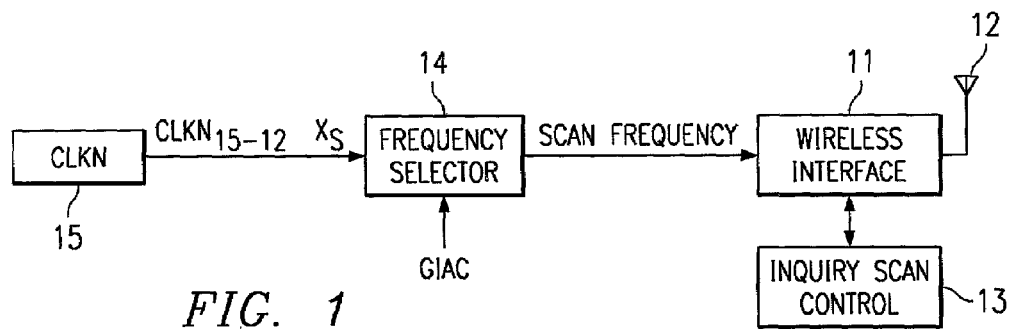
FIG. 1 diagrammatically illustrates pertinent portions of exemplary embodiments of a slave device according to the invention.

According to exemplary embodiments of the invention, instead of scanning over the 32 possible frequencies, the slave scans over 16 possible frequencies. By ensuring that the master starts its inquiry with those 16 frequencies, the inquiry process can be accelerated. According to exemplary embodiments of the invention, the slave only scans over frequencies with an X input of 0 to 15, so the X input value into the frequency selector of the slave is given, for example, by:

$$X_S = CLKN_{15-12} \quad (2)$$

Also according to exemplary embodiments of the invention, the master starts its inquiry using the frequencies given by X input values of 0 to 15. To ensure that this occurs, the value of $\kappa_{offset}$ (see Equation (1) above) is defined, for example, as:

$$\kappa_{offset} = 32 - CLKN_{16-12} * \text{for train A} \quad (3)$$

$$\kappa_{offset} = 16 - CLKN_{16-12} * \text{for train B} \quad (4)$$

where $CLKN_{16-12}*$ is the value of the clock at the start of the inquiry substate. Thus $\kappa_{offset}$ for train A and $\kappa_{offset}$ for train B are constants once the inquiry substate has begun.

When the master enters the inquiry substate, it will begin with train A and will send inquiry messages on the frequencies corresponding to X=0, 1, 2, ..., 15. Each slave will be monitoring one of these 16 frequencies and will be able to hear the master's inquiry within, in some embodiments, 2.56 seconds. This represents a reduction of about a factor of 2 in the required inquiry time, as compared to the prior art. There may also be other slaves that are legacy slaves that use the conventional inquiry scan frequencies. In some embodiments, the master can switch between trains in order to ensure that legacy slaves can hear its inquiry messages.

Other embodiments can use mappings other than the example given above, so long as the slaves can use a subset of the 32 frequencies for inquiry scan, and the master can start its inquiry with that subset of frequencies to minimize the time needed for inquiry.

FIG. 1 diagrammatically illustrates pertinent portions of exemplary embodiments of a slave device according to the invention. The slave device of FIG. 1 can be, for example, any Bluetooth device. As shown in FIG. 1, the native clock bits of Equation (2) are applied to the X input of a conventional Bluetooth frequency selector 14. The frequency selector 14 is responsive to the X input and the GIAC for selecting a scan frequency and indicating the selection to a wireless communication interface 11. The wireless interface 11 is cooperable with the frequency selector 14, a conventional inquiry scan controller 13 and an antenna 12 for performing slave inquiry scan operations in conventional fashion. The antenna 12 receives the master's inquiry message via a wireless communication channel.

Figure 2:
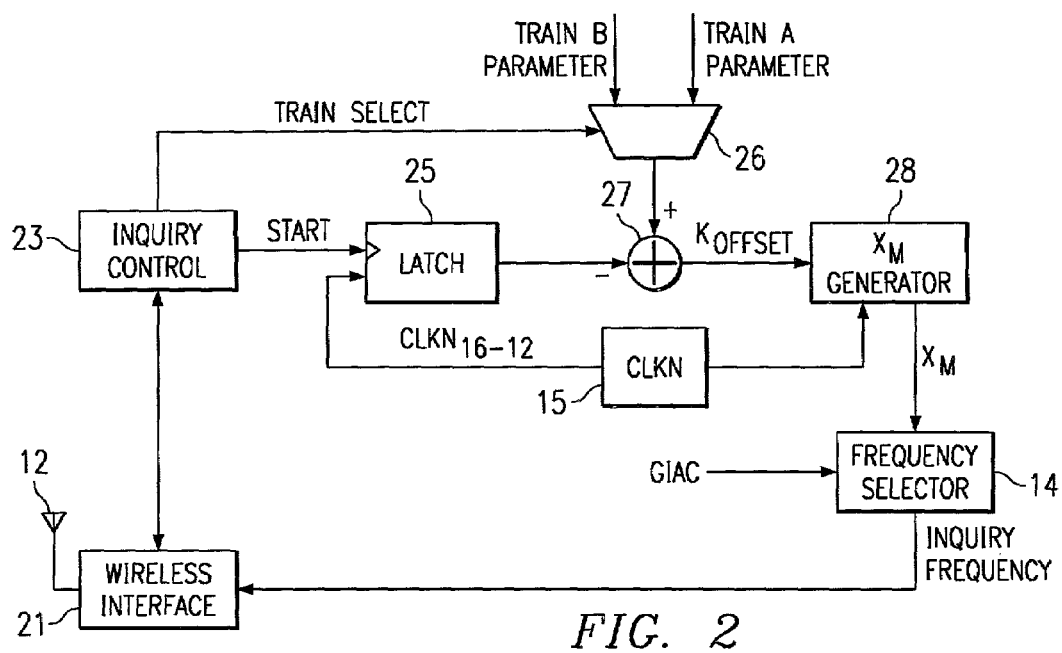
FIG. 2 diagrammatically illustrates pertinent portions of exemplary embodiments of a master device according to the invention.

FIG. 2 diagrammatically illustrates pertinent portions of exemplary embodiments of a master device according to the invention. The master device of FIG. 2 can be, for example, any Bluetooth device. In the device of FIG. 2, an inquiry controller 23 controls the master's inquiry operations. When the inquiry operations begin, the inquiry controller 23 produces a start signal which is used to clock a latch 25 to latch bits 12–16 of the native clock (CLKN) 15. Thus, at the beginning of inquiry operations, the current state of bits 12–16 of the native clock is stored at the output of latch 25.

The inquiry controller 23 also produces a train select signal which controls a selector 26 to select a train A parameter or a train B parameter. In the examples of Equations (3) and (4) above, the train A parameter has a value of 32 and the train B parameter has a value of 16. The selector 26 permits accommodation of legacy slaves in the manner generally described above (i.e., switching between trains). Either the train A parameter or the train B parameter is combined at 27 (by an adder in this example) with the output of latch 25 to thereby realize either Equation (3) or Equation (4) above. The resulting $\kappa_{offset}$ value is applied to an $X_M$ generator 28 which implements Equation (1) above to produce $X_M$. The value of $X_M$ is input to a conventional frequency selector 14 which selects an inquiry frequency in response to $X_M$ and the GIAC. The selected inquiry frequency is indicated to a wireless communication interface 21 which is cooperable in conventional fashion with the frequency selector 14, the inquiry controller 23 and an antenna 12 for performing the desired master inquiry operations. The antenna 12 transmits the master's inquiry message to a slave via a wireless communication channel.

Figure 3:
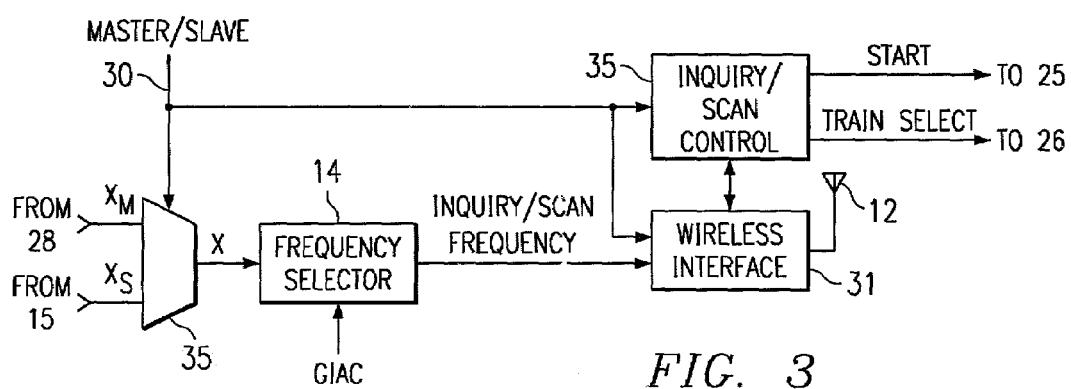
FIG. 3 diagrammatically illustrates pertinent portions of exemplary embodiments of a device which can function as either a master device or a slave device according to the invention.

FIG. 3, taken in conjunction with FIGS. 1 AND 2, diagrammatically illustrates pertinent portions of exemplary embodiments of a device which can perform as either a master device or a slave device according to the invention. The device of FIG. 3 can be, for example, any Bluetooth device. As shown in FIG. 3, a configuration signal 30 determines whether the device is configured for operation as a master device or a slave device. If the device is configured as a master device, then the value of X input to the frequency selector 14 is the master value $X_M$ produced by the generator 28 of FIG. 2. If the device is configured as a slave device, then the value of X input to the frequency selector 14 is provided as the slave value $X_S$ selected from the native clock 15 in FIG. 1.

The configuration signal 30 is also input to an inquiry/scan controller 35 which can operate either in generally the same fashion as the inquiry controller 23 of FIG. 2 or the inquiry scan controller 13 of FIG. 1, depending on whether the configuration signal 30 indicates master or slave operation, respectively. The frequency selector 14 is responsive to the input value of X and the GIAC for selecting an inquiry/scan frequency which indicates either the master's inquiry frequency or the slave's scan frequency (depending on whether master or slave operation is selected). A wireless communication interface 31 is also connected to receive the configuration signal 30. If the configuration signal 30 indicates master operation, then the wireless communication interface 31 cooperates with the controller 35, the frequency selector 14 and the antenna 12 in the same general fashion described above with respect to the wireless communication interface 21 of FIG. 2. If the configuration signal 30 indicates slave operation, then the wireless communication interface 31 cooperates with the controller 35, the frequency selector 14 and the antenna 12 in the same general fashion described above with respect to the wireless communication interface 11 of FIG. 1.

Figure 4:
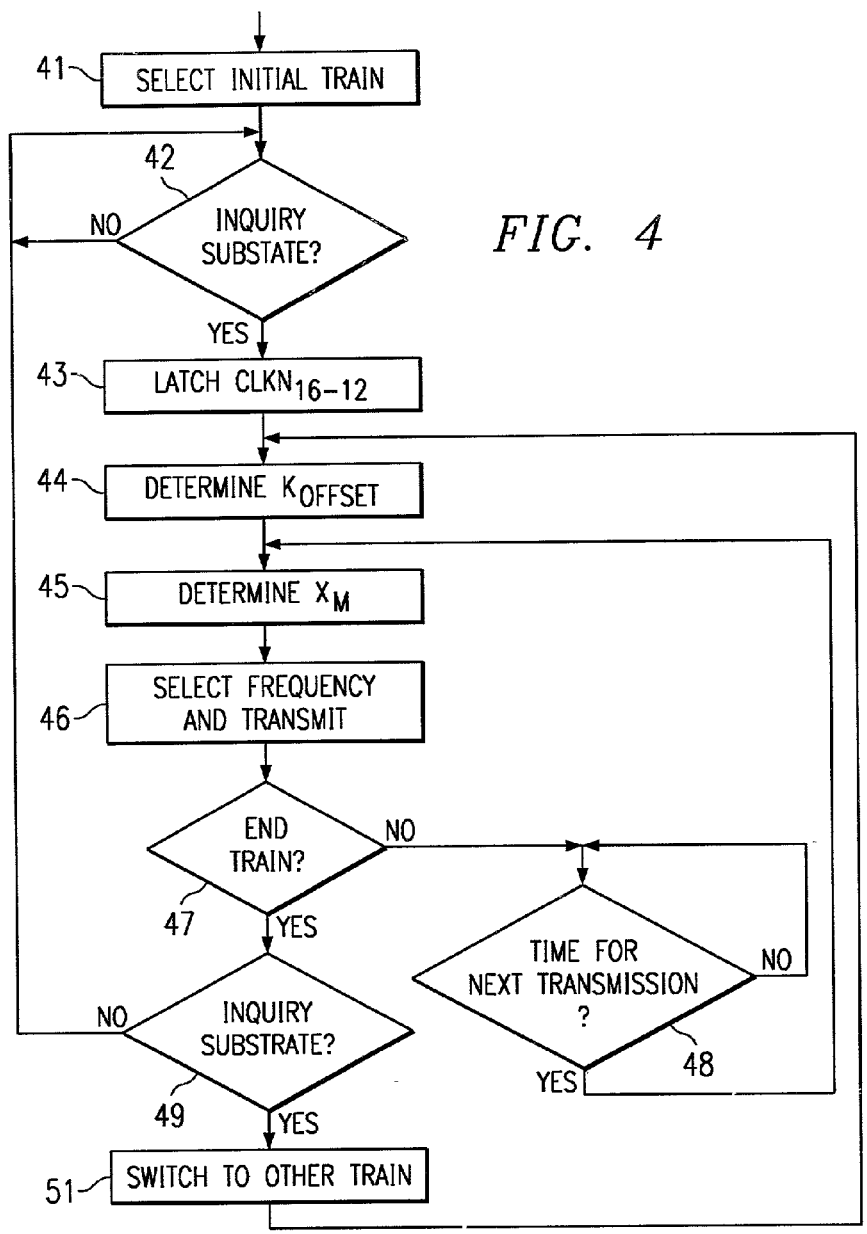
FIG. 4 illustrates exemplary operations which can be performed by the embodiments of FIGS. 2 and 3.
Figure 5:
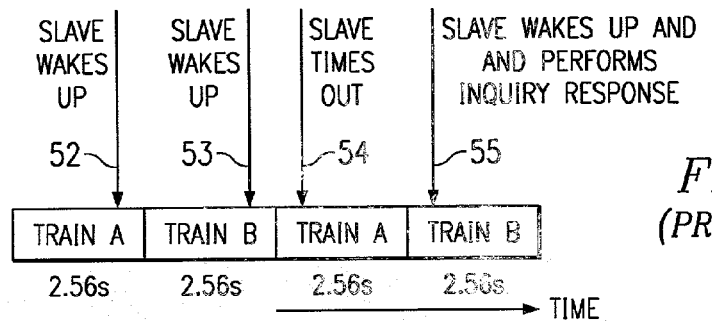
FIG. 5 is a timing diagram which illustrates a problem that can arise during conventional Bluetooth inquiry operations.

FIG. 4 illustrates exemplary operations which can be performed by the embodiments of FIGS. 2 and 3. An initial frequency train is selected at 41. Upon entry into the inquiry substate at 42, bits 12–16 of the native clock are latched at 43. Thereafter, the value of $\kappa_{offset}$ corresponding to the initial frequency train is determined at 44, and the value of $X_M$ is determined at 45. At 46, the inquiry frequency is selected and the inquiry is transmitted on the selected frequency. Thereafter, if the current frequency train is not completed at 47, then the time for the next inquiry transmission is awaited at 48. At the time for the next inquiry transmission, the operations described above at 45–48 are repeated until the current frequency train is completed at 47.

If the current frequency train is completed at 47, and if the inquiry substate is still in effect at 49, then the other train is switched to at 51, after which the operations described above at 44–49 can be repeated for the new frequency train. When it is determined at 49 that the inquiry substate is no longer in effect, then the next inquiry substate is awaited at 42.

Exemplary embodiments of the invention permit the slave to avoid the aforementioned problem wherein the master changes trains before the slave can backoff and respond. In the prior art, when the slave wakes up after the random backoff time, the slave listens on the frequency corresponding to an X input value at the slave frequency selector given by:

$$X_S = CLKN_{16-12}* \quad (5)$$

where $CLKN_{16-12}*$ is the value of the clock when the slave was first triggered. According to exemplary embodiments of the invention, the slave listens on the frequency associated with Equation (5) for 18 time slots. If no trigger occurs during this 18 time slot inquiry scan window, then the slave switches to a new frequency corresponding to an X input value at the slave frequency selector given by:

$$X'_S = (CLKN_{16-12}* + 16) \bmod 32 \quad (6)$$

which gives the corresponding frequency of the alternate train. This will allow the slave to respond to the master even if the master switches trains during the backoff time. If the slave is not triggered with the new inquiry scan frequency (corresponding to $X'_S$) after 18 time slots, then it returns to the original frequency (corresponding to $X_S$), and cycles between the two frequencies until the time-out period expires.

If the slave is triggered, then it returns an FHS packet and increments the phase of the inquiry hopping sequence. When the slave enters the inquiry hop substate again, it performs the inquiry scan on the train where it was triggered.

If the slave was triggered on $X_S = CLKN_{16-12}*$, then it begins the inquiry scan on $X_S = (CLKN_{16-12}* + 1) \bmod 32$.

If the slave was triggered on $X'_S = (CLKN_{16-12}* + 16) \bmod 32$, then it begins the inquiry scan $X'_S = (CLKN_{16-12}* + 17) \bmod 32$.

After each FHS packet is sent, the inquiry scan frequencies are incremented.

The exemplary alternating train switching operations described above are illustrated diagrammatically in FIG. 6. After the random backoff time at 62, if the slave is not triggered during its 18 time slot inquiry scan window (see 63 and 64), the slave switches to a frequency of the other train, and continues alternating between trains until either the slave is triggered or a timeout occurs. After the slave is triggered and an FHS packet is sent at 65 or 66, the slave increments the phase of the inquiry hopping sequence at 67 or 68. If the slave triggered on the train corresponding to $X'_S$, then the values of $X_S$ and $X'_S$ are swapped at 69 to ensure that the next inquiry scan (after another random backoff time) is performed on the train where the slave was last triggered. The exemplary operation shown in FIG. 6 can reduce the amount of time needed for inquiry by almost a factor of 2. The slave will be triggered, in some embodiments, in the first 5.12 seconds on either train A or train B. Allowing, for example, 1.28 seconds for the slave to respond, the inquiry time can be reduced from 10.24 seconds to 6.40 seconds.

Figure 6:
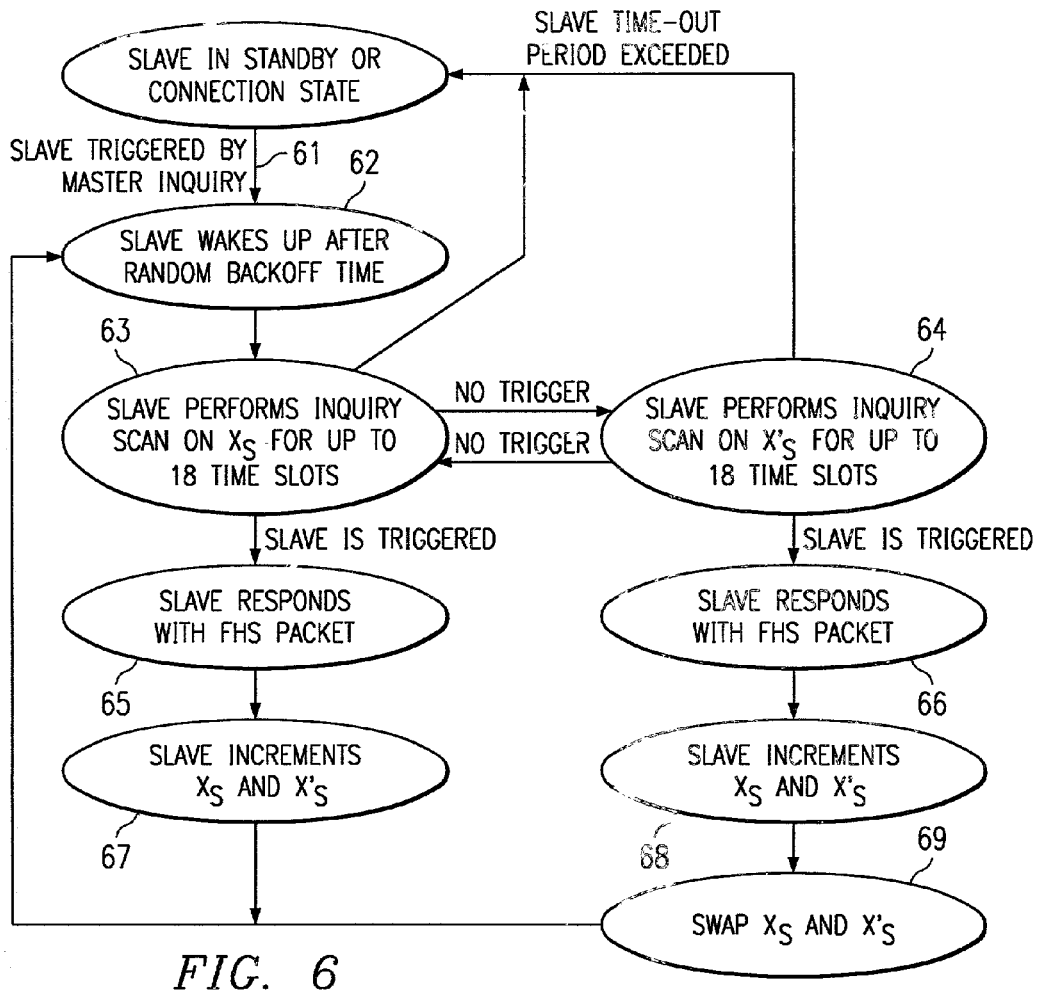
FIG. 6 illustrates exemplary operations according to the present invention.
Figure 7:
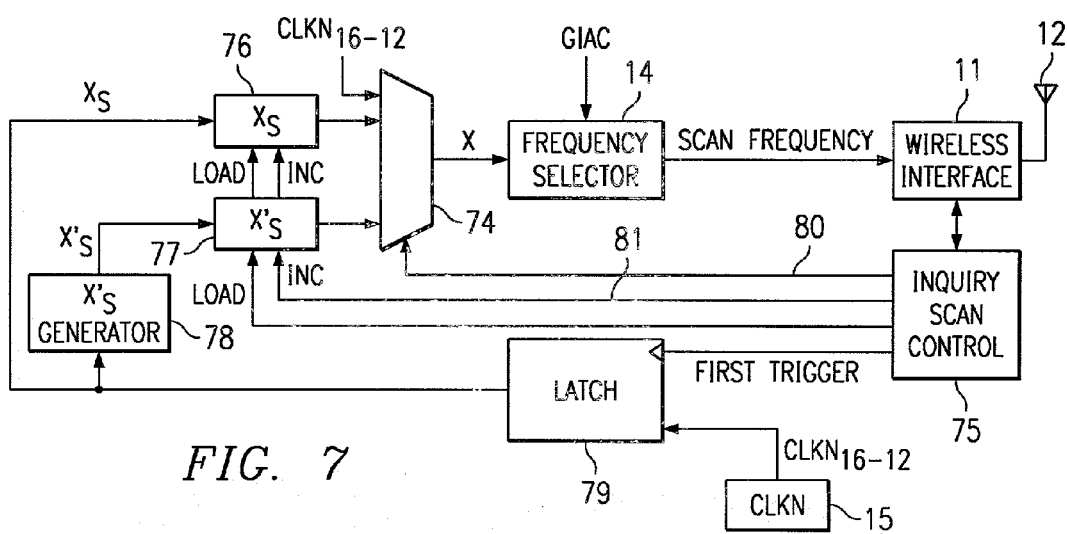
FIG. 7 diagrammatically illustrates pertinent portions of exemplary embodiments of a slave device according to the invention.

FIG. 7 diagrammatically illustrates pertinent portions of exemplary embodiments of a slave device according to the invention. The device of FIG. 7, which can be, for example, any Bluetooth device, is capable of performing the exemplary operations illustrated in FIG. 6. Before the slave is initially triggered (see 61 in FIG. 6), the inquiry scan controller 75 controls a selector 74 such that the frequency selector 14 receives an X input value defined by bits 12–16 of the native clock, as is conventional. Thus, prior to initial triggering, the inquiry scan controller 75, frequency selector 14, wireless communication interface 11 and antenna 12 cooperate in conventional fashion to perform the conventional slave inquiry scan operation.

After initial triggering of the slave device (see 61 in FIG. 6), the inquiry scan controller 75 determines and implements the random backoff time (see 62 in FIG. 6). After expiration of this first random backoff time, the inquiry scan controller 75 outputs a first trigger signal which drives the clock input of a latch 79. In response to the first trigger signal, the latch 79 latches bits 12–16 of the native clock 15, thereby storing those bits. These latched native clock bits are loaded into an $X_S$ register 76 under control of a load signal from the controller 75. The output of the latch 79 is also applied to an $X'_S$ generator 78 which implements Equation (6) above to produce $X'_S$, which is in turn loaded into an $x'_S$ register 77 under control of the load signal from the controller 75. The controller 75 then uses control signal 80 to select at 74 one of the registers 76 and 77 to provide the next X value to the input of the frequency selector 14.

The frequency selector 14 is responsive to the X input value and the GIAC to select the scan frequency to be used for the next 18 time slots and indicate this frequency to the wireless interface 11. If the slave is not triggered during those 18 time slots, then the controller 75 controls the selector 74 such that $x'_S$, as stored in register 77, is applied as the next X input value to the frequency selector 14 for the next 18 time slots. Until the slave triggers or a timeout (implemented and detected, for example, by the controller 75) occurs, the controller 75 continues to control selector 74 to switch between applying $X_S$ and $x'_S$ (for 18 time slots each) as the X input of the frequency selector 14.

Once the slave triggers, it sends an FHS packet in conventional fashion (see 65 or 66 in FIG. 6), and the controller 75 then uses control signal 81 to increment the contents of the registers 76 and 77. After the next random backoff time has expired, the controller 75 controls selector 74 such that the contents of register 76 are applied as the X input to frequency selector 14 if $X_S$ caused the last triggering of the slave, or such that the contents of register 77 are applied as the X input to frequency selector 14 if $x'_S$ caused the last triggering of the slave.

It will be evident to workers in the art that the embodiments described above with respect to FIGS. 1–7 can be readily implemented by suitable modifications in software, hardware or a combination of software and hardware in conventional Bluetooth devices.

Although exemplary embodiments of the invention are described above in detail, this does not limit the scope of the invention, which can be practiced in a variety of embodiments.

What is claimed is:

1. A wireless communication apparatus, comprising:
   a wireless communication interface for transmitting an inquiry message over a wireless communication channel;
   a controller arranged to produce a select signal corresponding to one of a first and second plurality of frequencies, the select signal initially corresponding to the first plurality of frequencies for every inquiry message; and
   a frequency selection apparatus coupled to said wireless communication interface for controlling said wireless communication interface to transmit the inquiry message successively an each of the first plurality of frequencies and thereafter successively on each of the second plurality of frequencies in response to the select signal.

2. The apparatus of claim 1, wherein said frequency selection apparatus includes a first selector for selectively providing one of first and second parameters respectively associated with said first and second pluralities of frequencies in response to the select signal.

3. The apparatus of claim 2, wherein said frequency selection apparatus includes a clack for producing a clock signal, and a storage apparatus coupled to said clock for storing said clock signal.

4. The apparatus of claim 3, wherein said storage apparatus includes an input for receiving a signal indicative of a point in time at which said storage apparatus is to store said clock signal.

5. The apparatus of claim 3 wherein said frequency selection apparatus includes a combiner coupled to said storage apparatus and said first selector for combining one of said first and second parameters with said stored clock signal to produce result information.

6. The apparatus of claim 5, wherein said combiner is an arithmetic combiner.

7. The apparatus of claim 5, wherein said frequency selection apparatus includes a frequency selector coupled to said wireless communication interface for selecting frequencies and indicating the selected frequencies to said wireless communication interface, said frequency selection apparatus further including a frequency selector input generator coupled to said combiner and said frequency selector and responsive to said result information for producing an input signal for said frequency selector, said frequency selector responsive to said input signal for selecting frequencies.

8. The apparatus of claim 7, wherein said frequency selector input generator is also coupled to said clock and is further responsive to said clock signal for producing said frequency selector input signal.

9. The apparatus of claim 3, wherein said clock signal includes a plurality of digital bits and said storage apparatus is a latch.

10. The apparatus of claim 1, provided as a Bluetooth device.

11. A method of wireless communication, comprising:
    entering an inquiry state for producing an inquiry message on a first and a second plurality of frequencies;
    selecting the first plurality of frequencies for every initial inquiry message after the step of entering;
    selecting the second plurality of frequencies for a subsequent inquiry message; and
    transmitting the inquiry message successively on each of the first plurality of frequencies and thereafter successively on each of the second plurality of frequencies.

12. The method of claim 11, including selectively providing one of first and second parameters respectively associated with said first and second pluralities of frequencies.

13. The method of claim 12, including providing a clock signal, and storing said clock signal at a desired point in time.

14. The method of claim 13, including combining one of said first and second parameters with said stored clock signal to produce result information.

15. The method of claim 14, wherein said combining step includes arithmetically combining one of said first and second parameters with said stored clock signal.

16. The method of claim 14, including selecting frequencies in response to said result information.

17. The method of claim 16, wherein said selecting step includes selecting frequencies also in response to said clock signal.

18. The method of claim 13, wherein said storing step includes storing said clock signal at a selected point in time.

19. The method of claim 18, wherein said clock signal includes a plurality of digital bits and said storing step includes latching said clock signal.

20. The method of claim 11, wherein said inquiry message is a Bluetooth inquiry message.

21. A method of receiving an inquiry message transmitted successively on each of a first plurality of wireless communication frequencies and thereafter successively on each of a second plurality of wireless communication frequencies, comprising:
    initially receiving the inquiry message, and thereafter waiting until expiration of a backoff period of time;
    first listening for said inquiry message for a predetermined time on a first frequency of said first plurality of frequencies in response to expiration of said backoff period; and
    second listening for said inquiry message for a predetermined time on a second frequency of the second plurality of frequencies if said inquiry message is not received on said first frequency during said first listening step.

22. The method of claim 21, including, if the inquiry message is not received on said second frequency during said second listening step, repeating said first listening step.

23. The method of claim 22, including alternatingly performing said first and second listening steps until the inquiry message is received or a timeout occurs.

24. The method of claim 21, including selecting a length of said backoff period randomly.

25. The method of claim 21, including, if said inquiry message is received during either of said listening steps, repeating said waiting step and thereafter alternatingly performing said first and second listening steps on third and fourth frequencies, respectively, starting with said first listening step; and said third and fourth frequencies contained respectively within said first and second pluralities of frequencies if said inquiry message was received on said first frequency during said first listening step, and said third and fourth frequencies contained respectively within said second and first pluralities of frequencies if said inquiry message was received on said second frequency during said second listening step.

26. The method of claim 21, including providing a clock signal, and storing the clock signal at a selected point in time.

27. The method of claim 26, wherein the selected point in time corresponds to said initial receipt of said inquiry message.

28. The method of claim 27, including selecting said first and second frequencies in response to said stored clock signal.

29. The method of claim 26, including selecting the first and second frequencies in response to said stored clock signal.

30. The method of claim of 29, wherein said stored clock signal is a digital value, and wherein said step of selecting said first and second frequencies includes performing an arithmetic operation on said stored clock signal.

31. The method of claim 21, wherein the predetermined time associated with one of said first and second listening steps is significantly shorter than a total amount of time occupied by all of said transmissions on one of the first and second pluralities of frequencies.

32. The method of claim 21, wherein the predetermined times respectively associated with said first and second listening steps are equal to one another.

33. The method of claim 21, wherein said inquiry message is a Bluetooth inquiry message.

34. A wireless communication apparatus for receiving an inquiry message transmitted successively on each of a first plurality of wireless communication frequencies and thereafter successively on each of a second plurality of wireless communication frequencies, comprising:

a wireless communication interface far initially receiving the inquiry message;

a controller coupled to said wireless communication interface and responsive to initial receipt of the inquiry message for implementing a backoff time period;

a frequency selection apparatus coupled to said controller and said wireless communication interface and responsive to said controller after expiration of said backoff period for directing said wireless communication interface to first listen for said inquiry message for a predetermined time on a first frequency of said first plurality of frequencies; and said frequency selection apparatus responsive to said controller if said inquiry message is not received on said first frequency during said first listening operation for directing said wireless communication interface to secondly listen for said inquiry message for a predetermined time on a second frequency of said second plurality of frequencies.

35. The apparatus of claim 34, wherein said frequency selection apparatus is responsive to said controller if the inquiry message is not received on said second frequency during said second listening operation for directing said wireless communication interface to repeat said first listening operation.

36. The apparatus of claim 35, wherein said frequency selection apparatus is responsive to said controller for directing said wireless communication interface to perform alternatingly said first and second listening operations until the inquiry message is received or said controller detects a dine out.

37. The apparatus of claim 34, wherein said controller is operable for selecting a length of said backoff period randomly.

38. The apparatus of claim 34, wherein said controller is operable in response to receipt of the inquiry message during either of said listening operations for again implementing a backoff period, said frequency selection apparatus responsive to said controller after expiration of said last-mentioned backoff period for directing said wireless communication interface to perform alternatingly said first and second listening operations on third and fourth frequencies, respectively, starting with said first listening operation; and said third and fourth frequencies respectively contained within said first and second pluralities of frequencies if said inquiry message was received on said first frequency during said first listening operation, and said third arid fourth frequencies respectively contained within said second and first pluralities of frequencies if said inquiry message was received on said second frequency during said second listening operation.

39. The apparatus of claim 34, including a clock for providing a clock signal, said frequency selection apparatus including a storage apparatus coupled to said clock and said controller for storing said clock signal at a point in time designated by said controller.

40. The apparatus of claim 39, wherein said storage apparatus includes a latch.

41. The apparatus of claim 39, wherein said point in time corresponds to said initial receipt of said inquiry message.

42. The apparatus of claim 41, wherein said frequency selection apparatus is operable for selecting said first and second frequencies in response to said stored clock signal.

43. The apparatus of claim 39, wherein said frequency selection apparatus is operable for selecting said first and second frequencies in response to said stored clock signal.

44. The apparatus of claim 43, wherein said stored clock signal is a digital value, said frequency selection apparatus including a signal generator coupled to said storage apparatus for performing an arithmetic operation on said stored clock signal.

45. The apparatus of claim 44, wherein said frequency selection apparatus includes a signal selector having a control input coupled to said controller, having signal inputs respectively coupled to said storage apparatus and said signal generator, and having a signal output.

46. The apparatus of claim 45, wherein said frequency selection apparatus includes a frequency selector having an input coupled to said signal output of said signal selector and having an output coupled to said wireless communication interface, said frequency selector responsive to said signal output of said signal selector for selecting a frequency and indicating the selecting frequency to said wireless communication interface.

47. The apparatus of claim 34, provided as a Bluetooth device.

48. The apparatus of claim 34, wherein the predetermined time associated with one of said first and second listening operations is significantly shorter than a total amount of time occupied by all of said transmissions on one of the first and second pluralities of frequencies.

49. The apparatus of claim 34, wherein the predetermined times respectively associated with said first and second listening operations are equal to one another.

* * * * *